Feb. 19, 1957     H. M. SILVERBERG     2,781,966
LINE COUNTER
Filed Oct. 6, 1953
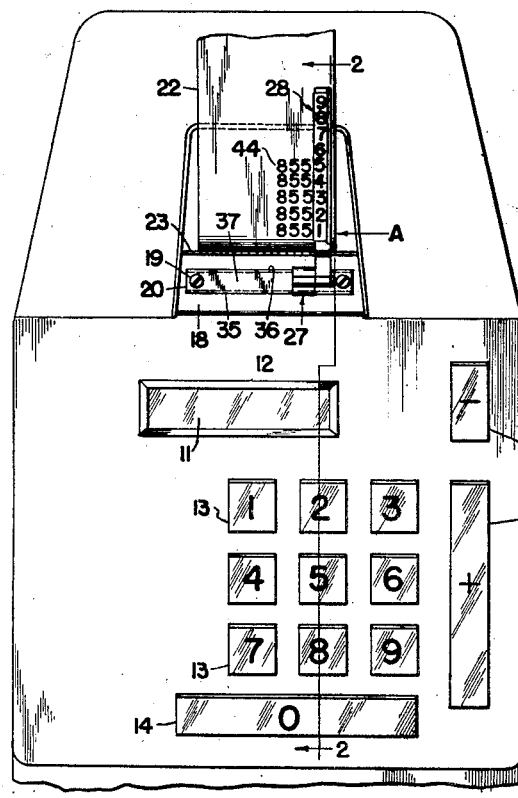
FIG. 1.
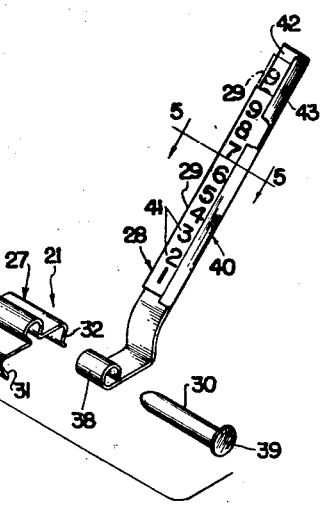
FIG. 5.
FIG. 4.
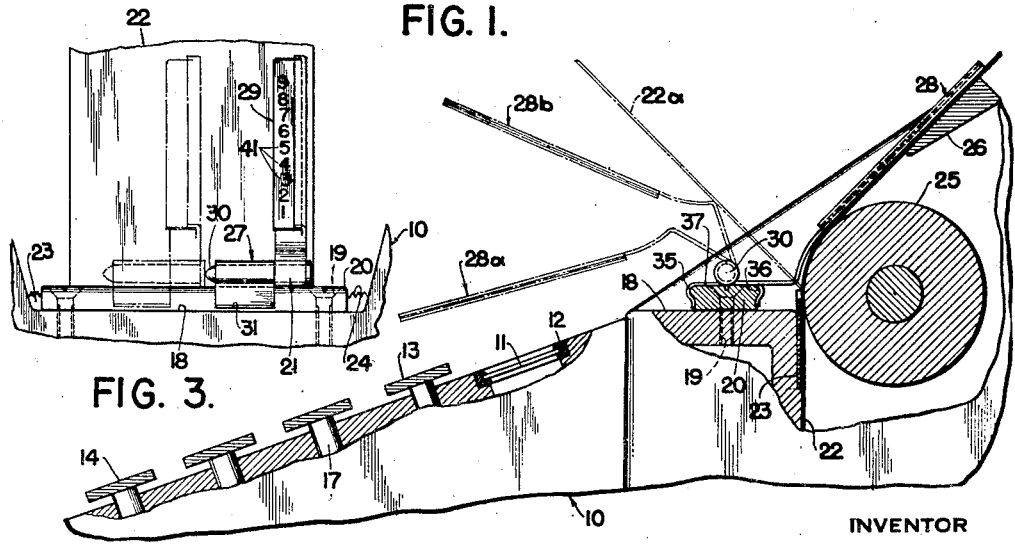
FIG. 3.
FIG. 2.
INVENTOR
HARRY M. SILVERBERG.
BY
ATTORNEY.

United States Patent Office 2,781,966
Patented Feb. 19, 1957

2,781,966
LINE COUNTER
Harry M. Silverberg, Queens Village, N. Y.
Application October 6, 1953, Serial No. 384,393
2 Claims. (Cl. 235—60)

This invention relates to office machines having advanceable recording sheets or tapes, and more particularly to devices for indicating repeated lines on calculating machines.

In the operation of conventional adding machines it is at times required to repeat a series of identical numerals, effected by repeatedly depressing the motor bar the desired number of times. This repetitious operation frequently results in an inadvertent erroneous number of such operative key-depressions, so that there are either more or less than the intended number of repeats of the same numeral. And where there are a large number of such repeats, it generally is necessary to check the operator's accuracy by counting the number of repeated numerals in the recorded column on the adding machine tape. Hence, with the conventional machine, there is either the danger of an unobserved inaccuracy, or a time-consuming effort in checking the accuracy of the operation.

It is a primary object of this invention to obviate the danger of such errors by enabling the operator to observe at the glance the number of repeated items in the recorded column on the tape, thereby eliminating the aforesaid time-consuming checking operation. And in the accomplishment of this objective, it is within my contemplation to provide a calculating machine with a device having a novel indicator positioned in conveniently proximate relation to the movable tape containing the printed or typed numerals, the indicator having a column of numbers spaced to correspond with the distance between the recorded lines on the tape, whereby, in the preferred form of my invention, the first or topmost of the column of repeated numerals will be adjacent a number on the device which will indicate the number of times the numeral was repeated.

It is another object of this invention to enable the ready replacement or positional adjustment of the indicator, whereby the device is adaptable for use with machines of different recorded line spacings, and is also capable of being readily moved to a desired initial setting on the machine in which it is embodied.

It is further within my contemplation to enable the device to be readily retracted from its operative indicating position, so as to permit the tape with the columnar recordings thereon to be torn off on the conventional serrated cutting edge of the machine. In this aspect of my invention it is a further object to enable the tape to effectuate the said retraction of the device during the operation of bringing the tape forwardly for the said severing operation.

And it is my objective to provide a simple and easily fabricated device having the aforesaid features, and which can be readily attached to conventional calculating machines.

Other objects, features and advantages will appear from the drawings and the description hereinafter given.

Referring to the drawings,

Figure 1 is a plan view of an adding machine provided with a form of my invention, the indicating device being shown operatively in place.

Figure 2 is a fragmentary section of Figure 1 taken substantially along line 2—2 thereof, the dot-dash lines showing the tape and indicating device at a forward position with the tape in operative engagement with the serrated severing edge, and also showing the indicating device at an extreme forwardly retracted position.

Figure 3 is a fragmentary front view of Figure 2, the dot-dash lines showing the indicator device in a laterally shifted position.

Figure 4 is an exploded perspective view of the components of the indicator device, the dot-dash lines illustrating a vertically shifted position of the indicator strip, a fragment being broken away for clarity.

Figure 5 is a section of Figure 4 taken along line 5—5.

In the form of my invention illustrated, the conventional adding machine 10 contains the window 11 in casing 12, and the keys 13, 14, 15 and 16 with stems 17 extending into the casing 12, said window and stems being cooperatively associated with an internal mechanism well known to those skilled in the art and which it is not deemed necessary to describe herein since it is not required for an understanding of the present invention. The body of machine 10 contains a platform 18 to which is secured, by fasteners 19, the transverse bar 20 serving as a slide support for the indicator device 21, to be hereinafter described. The tape 22, fed from within casing 12 in well-known manner, extends upwardly along the severing plate 23 provided with the serrated severing edge 24 adjacent the periphery of the roller 25, said tape being in operative engagement with a portion of said periphery above said serrated edge 24 and extending therebeyond for overlying engagement with the rest 26, in conventional manner.

The said indicating device 21 comprises the slide clamp 27, the pivotal indicator arm 28 with the indicator strip 29, and the pivot pin 30. In the particular form illustrated, the said clamp 27 comprises the downwardly and inwardly converging side legs 31 and 32 joined by the flat bridge 33 the central portion of which is pressed upwardly to form the hollow substantially cylindrical portion or loop 34 proportioned to accommodate therein a portion of the said pivot pin 30 when the components of the member 21 are operatively assembled. The arrangement is such that the legs 31 and 32 and the bridge 33 are in embracing slidable engagement with the correspondingly shaped sides 35 and 36 and top 37 of the said bar 20. The indicator arm 28 contains a lower loop 38 proportioned to rotatably fit over the shank of the pin 30. Hence, when the indicator device is assembled, as shown in Figures 1 and 3, the loops 34 and 38 are in engagement to form an axially aligned housing for the pin 30, the head 39 of which is in engagement with the adjacent end of loop 38. The indicator arm 28 is thus pivotally mounted, and can pivotally be swung between its rearwardly inclined operative position supported by the rest 26, and its forwardly retracted positions, as illustrated by the dot-dash lines of Figure 2.

In the form illustrated, this indicator arm 28 has an upwardly extending and rearwardly inclined flat number-bearing bar 40, so proportioned and disposed that it will engage the tape 22 and maintain it in engagement with the underlying rest 26. Since the clamp 27 is slidably mounted upon bar 20, the entire device 21 can be moved laterally relative to the tape 22, for reasons which will hereinafter be referred to.

The said number-bearing bar 40 of the indicator arm has on the upper exposed portion thereof a longitudinal column of numbers identified by the reference numeral 41, said column comprising the numbers "1", "2", "3", "4", "5", "6", "7", "8" and "9". In the particular structure shown, said numbers appear on the exposed face of the sheet strip 29 which is frictionally held in place between the rear wall 42 and marginal flap 43 of bar 40, said flap being an integral part of the bar and bent back thereover to overlap the right marginal portion of the said strip 29, leaving the numbers 41 exposed to view. It is preferred that the entire indicator arm 28 be made of thin sheet material, not only so that it could readily be fabricated by conventional methods, but also so that the flap 43 could readily be pressed into and out of engagement with the number-bearing strip 29. The arrangement is hence such that different strips 29 can be readily attached to the said bar 40, with numbers thereon spaced to correspond with the requirements of different calculating machines, and also that a strip 29 can be adjustably positioned on the bar 40—as suggested by its dot-dash position in Figure 4—to provide the correct operative position therefor.

In the operative use of this device, selected ones of the keys 13 to 16 may be depressed to simultaneously actuate the internal calculating mechanism and the recording mechanism for impressing on tape 22 the numerals corresponding to the keys depressed, in known manner. If it is desired, for example, to add the numeral "855" five times, the appropriate keys are depressed and the machine operatively actuated to produce a column containing five numerals "855", as indicated by the column 44 on the tape of Figure 1. The position of "1" on the strip 29 is preset at the level indicated by arrow "A" (Figure 1), at which level the printing impressions are made by conventional type elements operatively elevated by known mechanisms not herein shown. The numbers on the bar 40 are in columnar formation parallel to the columnar formations of the numerals of column 44 on tape 22, and are spaced to correspond to the spacing of the numbers on said tape 22; that is, the distance between lines of the numerals on the tape, like that between the numerals in column 44, is determinative of the distance between the numbers 41. Hence, by referring to Figure 1, it will be seen at a glance that there have been five repeats of the numeral "855", since the number "5" on bar 40 is adjacent the first or topmost of the numerals in column 44.

This not only is useful in the efficient addition of like numbers, but it also provides a quick method of effecting multiplication on adding machines. For example, the setting illustrated in Figure 1 plainly shows that "855" has been multiplied by "5".

Should it be desired to position the bar 40 at any other position of the tape, so that the numbers on the bar may be closer to any vertically aligned set of numerals on the tape, the entire assembly of device 21 can be shifted to the desired position by slidably moving the clamp 27 along bar 20, as indicated in Figure 3.

To retract the arm 28 from its operative position against the tape 22, it is pivotally moved forwardly, such as to the dot-dash position 28a of Figure 2. This will permit either the making of notations on the tape, or the removal of the recorded portion of the tape by bringing it forwardly to its dot-dash position 22a of Figure 2, at which position it may be torn off along the serrated severing edge 24 of the plate 23. It should be noted that, if the arm 28 has not been previously retracted forwardly, the operation of bringing the tape 22 forwardly will bring it into engagement with the arm 28, to swing said arm forwardly to its position 28b of Figure 2.

In the above description, the invention has been disclosed merely by way of example and in preferred manner; but obviously many variations and modifications may be made therein. It is to be understood, therefore, that the invention is not limited to any specific form or manner of practicing same, except insofar as such limitations are specified in the appended claims.

I claim:

1. In an indicating device for equally spaced lines of repeated numerals recorded in columnar formation on a tape operatively extending from the casing of a calculating machine, a bar supported by said casing, a clamp slidably mounted on said bar, an indicating arm pivotally supported by said clamp and rotatably movable between an operative position adjacent said tape and selected forwardly retracted positions relatively remote with respect to said tape, said arm having a number-bearing portion with a column of equally spaced numbers thereon in sequential order and disposed substantially parallel to said columnar formation on the tape when the arm is in its said operative position, the spacing of the numbers on said arm corresponding to the spacing of the numerals on said columnar formation.

2. In an indicating device for equally spaced lines of repeated numerals recorded in columnar formation on a tape operatively extending from the casing of a calculating machine, a transverse bar supported by said casing, a clamp having two oppositely positioned legs and a bridge portion joining said legs in embracing slidable engagement with said bar, said bridge portion having a pressed out loop, an indicating arm comprising a lower loop and an upwardly extending number-bearing portion, said lower loop being pivotally connected to said pressed out loop, said arm being rotatably movable between an operative position adjacent said tape and selected forwardly retracted positions relatively remote with respect to said tape, said number-bearing portion having a column of equally spaced numbers thereon in sequential order and disposed substantially parallel to said columnar formation on the tape when the arm is in its said operative position, the spacing of the numbers on said arm corresponding to the spacing of the numerals on said columnar formation.

References Cited in the file of this patent

UNITED STATES PATENTS

| | | |
|---|---|---|
| 559,571 | Derrick | May 5, 1896 |
| 1,030,453 | Barron | June 25, 1912 |
| 1,063,924 | McLaughlin | June 3, 1913 |
| 1,161,422 | Sundal | Nov. 23, 1915 |
| 1,595,608 | Kurowski | Aug. 10, 1926 |
| 2,255,622 | Landsiedel | Sept. 9, 1941 |

FOREIGN PATENTS

| | | |
|---|---|---|
| 209,814 | Great Britain | Jan. 16, 1924 |